US007356519B1

(12) United States Patent
Goldberg et al.

(10) Patent No.: US 7,356,519 B1
(45) Date of Patent: Apr. 8, 2008

(54) METHOD AND SYSTEM FOR SOLVING SATISFIABILITY PROBLEMS

(75) Inventors: Evgueni Goldberg, Berkeley, CA (US); Yakov Novikov, Minsk (BY)

(73) Assignee: Cadence Design Systems, Inc., San Jose, CA (US)

( * ) Notice: Subject to any disclaimer, the term of this patent is extended or adjusted under 35 U.S.C. 154(b) by 205 days.

(21) Appl. No.: 10/789,810

(22) Filed: Feb. 27, 2004
(Under 37 CFR 1.47)

Related U.S. Application Data (60) Provisional application No. 60/450,940, filed on Feb. 28, 2003.

(51) Int. Cl.
*G06F 17/00* (2006.01)
(52) U.S. Cl. .............................. 706/45; 706/12; 706/19; 706/21
(58) Field of Classification Search .................. 706/45, 706/19, 2, 12, 21
See application file for complete search history.

(56) References Cited

U.S. PATENT DOCUMENTS

| | | | | |
|---|---|---|---|---|
| 5,617,510 | A * | 4/1997 | Keyrouz et al. | 706/45 |
| 6,031,984 | A * | 2/2000 | Walser | 703/2 |
| 6,247,164 | B1 | 6/2001 | Ashar et al. | |
| 6,912,700 | B1 * | 6/2005 | Franco et al. | 716/5 |

OTHER PUBLICATIONS

Joao P. Marques-Silva, GRASP: A Search Algorithm for Propositional Satisfiability, May 1999, IEE Transactions on Computers, No. 5, vol. 48, pp. 507-521.*

Biere et al. "Symbolic Model Checking Using SAT Procedures Instead od BDD's", pp. 317-320.*
Marques-Silva et al. "GRASP: a Search Algorithm for Propositional Satisfiability", pp. 506-521.*
Bayardo et al. "Using CSP Look-Back Techniques to Solve Real-World SAT Instances", pp. 203-208.*
MArques-Silva et al. "GRASP: A Search Algorithm for Propositional Satisfiability" 1999, pp. 506-521.*
Moskewicz et al. "Chaff: Engineering an Efficient SAT Solver", 2001, pp. 530-535.*
Bierre et al. "Symbolic Model Checking Usng SAT procedures instead of BDDs" 1999, pp. 317-320.*
Bayardo et al. "Using CSP Look-Back Techniques to Solve Real-World SAT Instances" 1997, pp. 203-208.*

(Continued)

*Primary Examiner*—David Vincent
*Assistant Examiner*—Omar F Fernández Rivas
(74) *Attorney, Agent, or Firm*—Bingham McCutchen LLP (57) ABSTRACT

A method and system for solving satisfiability problems is disclosed. In one embodiment, clauses in a satisfiability problem are organized as a chronologically ordered stack. In another embodiment, the activity of each variable in the satisfiability problem is monitored. An activity counter is maintained for each variable and is incremented each time the variable appears in a clause used in generating a conflict clause. In an embodiment, a branching variable is selected from among the variables in the top clause of the stack when the top clause is a conflict clause. In a further embodiment, one or more conflict clauses in the stack are removed when the search tree is abandoned. In a still further embodiment, the value assigned to a branching variable is selected for purposes of having a uniform distribution of positive and negative literals.

56 Claims, 2 Drawing Sheets

OTHER PUBLICATIONS

Marques-Silva et al. "GRASP: A Search Algorithm for Propositional Satisfiability" 1999, pp. 506-521.*

Baptista, L. et al.; "*The Interplay of Randomization and Learning of Real-World Instances of Satisfiability*"; Proceedings of the AAAI Workshop on Leveraging Probability and Uncertainty in Computation; Jul. 2000.

Bayardo, R. et al.; "*Using CSP Look-Back Techniques to Solve Real-World SAT Instances*"; Proceedings of the Fourteenth National Conference on Artificial Intelligence and Ninth Innovative Applications of Artificial Intelligence Conference; 1997; pp. 203-208; American Association for Artificial Intelligence Press; USA.

Ben-Sasson, E. et al.; "*Near-Optimal Separation of Treelike and General Resolution*"; Electronic Colloquium on Computational Complexity, Report No. 5; Third Workshop on the Satisfiability Problem—May 2000; Jan. 17, 2000; pp. 14-18; ECCC; Israel.

Biere, A., et al.; "*Symbolic Model Checking Using SAT Procedures Instead of BDDs*"; Proceedings of Design Automation Conference—DAC'99; 1999; pp. 317-320; ACM; USA.

Brayton, R.K., et al.; "*Logic Minimization Algorithms for VLSI Synthesis*"; Kluwer Academic Publishers, 1984; USA.

Burch, J. R., et al.; "*Tight Integration of Combination Verification Methods*"; Proceedings of the International Conference on Computer-Aided Design; 1998; pp. 570-576; ACM, USA.

Davis, M., et al.; "*A Machine Program for Theorem-Proving*"; Communications of the ACM; 1962; pp. 394-397; USA.

Dubois, O., et al.; "*SAT versus UNSAT*"; Second DIMACS Series in Discrete Mathematics and Theoretical Computer Science; 1996; pp. 415-436; vol. 26; American Mathematical Society.

Freeman, J.W.; "*Improvements to Propositional Satisfiability Search Algorithms*"; A Dissertation in Computer and Information Science, University of Pennsylvania, 1995; USA.

Goldberg, E. et al.; "*Using SAT for Combinational Equivalence Checking*"; Proceedings of the Design Automation and Test in Europe Conference—2001; pp. 114-121; IEEE; USA.

Gomes, C. P., et al.; "*Boosting Combinatorial Search Through Randomization*"; Proceedings of the International Conference on Principles and Practice of Constraint Programming; 1998; pp. 431-437; American Association for Artificial Intelligence Press/ The MIT Press; USA.

Gomes; C. P., et al.; "*Heavy-Tailed Distributions in Combinatorial Search*"; Principles and Practice of Constraint Programming—CP97; 1997; pp. 121-135; Springer.

Li, C. M.; "*A Constraint-Based Approach to Narrow Search Trees for Satisfiability*"; Information Processing Letters 71; 1999; pp. 75-80; vol. 71; Elsevier Science B.V.; France.

Marques-Silva, J.; "*The Impact of Branching Heuristics in Propositional Satisfiability Algorithms*"; Proceedings of the 9th Portuguese Conference on Artificial Intelligence (EPIA); Sep. 1999; LNAI; pp. 62-74; 1695; Portugal.

Marques-Silva, J. P. et al.; "*GRASP: A New Search Algorithm for Satisfiability*"; CSE-TR-292-96; Apr. 10, 1996; pp. 1-17; The University of Michigan; USA.

Marques-Silva, J. P. et al.; "*GRASP: A Search Algorithm for Propositional Satisfiability*"; IEEE Transactions on Computers; May 1999; pp. 506-521; vol. 48; No. 5.

Moskewicz, M. W. et al.; "*Chaff: Engineering an Efficient SAT Solver*"; Proceedings of the 38th Design Automation Conference -DAC '01; 2001; pp. 530-535; ACM; USA.

Novikov, Y. A.; "*Using Restarts When Solving SAT-Instances*"; Proceedings of the Fourth International Conference on Computer-Aided Design of Discrete Devices CAD DD '01; 2001; pp. 166-174; vol. 3; National Academy of Sciences of Belarus Institute of Engineering Cybernetics; Republic of Belarus.

Stephan, P., et al.; "*Combinational Test Generation Using Satisfiability*"; IEEE Transactions on Computer-Aided Design of Integrated Circuits and Systems; Sep. 1996; pp. 1167-1176; vol. 15; No. 9; IEEE; USA.

Velev, M. N.; Curriculum Vitae; 2004; http://www.ece.cmu.edu/~mvelev.

Zhang, H.; "*Sato; An Efficient Propositional Prover*"; Proceedings of the 14th International Conference on Automated Deduction—CADE- 14; Jul. 1997; pp. 272-275; Springer; Australia.

Satlib—Benchmark Problems; 2004; http://www.satlib.org/benchm.html.

The SAT-Ex site; 2004; http://www.lri.fr/~simon/satex/satex.php3.

Goldberg, E. "Testing Satisfiability of CNF Formulas by Computing a Stable Set of Points" Proceedings of the Conference Autated Deduction (CADE 2002) Copenhagen, DK, Jul. 27-30, 2002, vol. 2392, pp. 161-180.

Goldberg, E. "Testing Satisfiability of CNF Formulas by Computing a Stable Set of Points" Annals of Mathematics and Artificial Intelligence, Jan. 2005, vol. 43, Issue 1-4, pp. 65-89.

Goldberg, E. et al. "BerkMin: A Fast and Robust SAT-Solver" Proceedings of the design, Automation and Test in Europe Conference and Exhibition (DATE-2002) Paris, FR, Mar. 4-8, 2002, pp. 142-149.

Goldberg, E. "On Bridging Simulation and Formal Verification" Technical Report, University of California at Berkeley, Feb. 2007, CDNL-TR-2007-0212.

Miroslav Velev's SAT Benchmarks, 3 pgs., located at: http://www.ece.cmu.edu/~mvelev/sat_benchmarks.html.

Goldberg, E. "Determinization of Resolution by an Algorithm Operating on Complete Assignments" SAT-2006, pp. 90-05.

Abramovici, M. et al. Digital Testing and Testable Design, Wiley-IEEE Press, Sep. 1990, Title page, Table of Contents and Chapters 2 through 10 (pp. 9-455).

Selman, B. et al. "A New Method for Solving Hard Satisfiability Problems" The 10th National Conference on Artificial Intelligence (AAAI-92), San Jose, CA, Jul. 12-16, 1992, pp. 440-446.

Selman, B. et al. "Noise Strategies for Improving Local Search" The 12th National Conference on Artificial Intelligence (AAAI-94), Seattle, WA, Jul. 31-Aug. 4, 1994, pp. 337-343.

Selman, B. et al. "Generating Hard Satisfiability Problems" Artificial Intelligence, 1996, vol. 81, pp. 17-29.

Sentovich, E.M. et al. "SIS: A System for Sequential Circuit Synthesis" Technical Report, University of California at Berkeley, 1992. Memorandum No. UCB/ERL M92/41.

* cited by examiner

METHOD AND SYSTEM FOR SOLVING SATISFIABILITY PROBLEMS

CROSS-REFERENCE TO RELATED APPLICATIONS

The present application claims the benefit of U.S. Provisional Application Ser. No. 60/450,940, filed Feb. 28, 2003, which is hereby incorporated by reference in its entirety for all purposes as if fully set forth herein.

BACKGROUND AND SUMMARY

The present invention is related to satisfiability problems. More particularly, the present invention is directed to a method and system for solving satisfiability problems.

The satisfiability (SAT) problem consists of determining a satisfying variable assignment, V, for a function (or formula), $f$, or determining that no such V exists. The function $f$ may be expressed in conjunctive normal form (CNF), which consists of the logical AND (i.e., conjunction) of one or more clauses. Each clause consists of the logical OR (i.e., disjunction) of one or more literals. A literal is a Boolean function of one argument or variable. Each variable x has a positive literal, i.e., the identity function of x, denoted as x, and a negative literal, i.e., the negation function of x, denoted as ~x.

One solution to the satisfiability problem is to search through all possible assignments. However, with n variables, there are $2^n$ possible assignments. Therefore, as the number of variables grows, the number of possible assignments to search through increases exponentially. This can make finding a solution very difficult. Since many problems in synthesis, automatic test pattern generation (ATPG), verification, artificial intelligence, cryptology, and other fields reduce to SAT problems, it is desirable to discover new methods and systems for solving SAT problems efficiently.

Some of the SAT-algorithms that have been developed include GRASP, SATO, and Chaff, which are described in J. P. M. Silva and K. A. Sakallah, *GRASP: A Search Algorithm for Propositional Satisfiability*, IEEE Transactions of Computers, volume 48, pages 506-521, 1999, H. Zhang, *SATO: An efficient propositional prover*, Proceedings of the International Conference on Automated Deduction, pages 272-275, July 1997, and M. W. Moskewicz, C. F. Madigan, Y. Zhao, L. Zhang, and S. Malik, *Chaff: Engineering an Efficient SAT Solver*, Proceeding of the 38th Design Automation Conference, 2001. All of these are search algorithms aimed at finding a satisfying assignment by variable splitting. Search algorithms of that kind are descendants of the Davis-Putnam-Loveland-Longemann (DPLL) algorithm, which is described in M. Davis, G. Longemann, and D. Loveland, *A Machine program for theorem proving*, Communications of the ACM, volume 5, pages 394-397, 1962.

When looking for a solution, the DPLL-algorithm examines a search tree. This tree-like search can be considered as an implementation of the tree-like resolution proof system which is a special case of general resolution. It was shown in E. Ben-Sasson, R. Impagliazzo, and A. Wigderson, *Near optimal separation of Treelike and General resolution*, Proceedings of SAT-2000: Third Workshop on the Satisfiability Problem, pages 14-18, May 2000, that there is an exponential gap between the performance of tree-like resolution and that of general resolution.

Search algorithms, such as GRASP, SATO, and Chaff, have made steps towards general resolution by trying to eliminate the drawbacks and limitations of pure tree-like resolution. For example, these SAT-solvers record conflict clauses, which are implicates of the original formula. Adding conflict clauses allows for pruning of many branches of the search tree that have yet to be examined. The deduced implicates are added to a clause database.

In addition, some of the SAT-algorithms use the strategy of restarts. A restart is when the SAT-algorithm abandons the current search tree (without completing it) and starts a new one. So instead of one complete search tree, a set of incomplete trees (except the last one) are constructed. In L. Baptista and J. P. Marques-Silva, *The interplay of randomization and learning on real-world instances of satisfiability*, Proceedings of AAAI Workshop on Leveraging Probability and Uncertainty in Computation, July 2000 and C. P. Gomes, B. Selman, and H. Kautz, *Boosting combinational search through randomization*, Proceedings of International Conference on Principles and Practice of Constraint Programming, 1997, the usefulness of restarts was proven experimentally.

Although current SAT-solvers have made substantial progress towards general resolution, much still needs to be done to improve performance and robustness. For example, there are formulas that can be finished in a few seconds by one SAT-solver, but cannot be solved by another SAT-solver. This suggests that these SAT-solvers are not robust, e.g., these SAT-solvers either solve a formula quickly or not at all regardless of how much time they are given to find a solution. Additionally, current SAT-solvers are not flexible enough to take into account a formula's structure. In many cases, this results in poor performance and lack of robustness, e.g., substantial change in performance occurs after the formula is slightly changed.

Some of the current SAT-solvers use the activity of variables in conflict making to single out good candidates for branching variables. They compute the activity of a variable by counting the number of occurrences of literals of each variable in conflict clauses. Separate counters are maintained for each literal. By only taking into account the occurrences of variables in conflict clauses, there may not be an accurate estimate of the activity of some variables. In particular, the variables that actively contribute to conflicts but do not appear in conflict clauses may be overlooked. For instance, if a variable is frequently assigned through deduction, it may drive many conflicts without appearing in conflict clauses. Therefore, if only conflict clauses are taken into account when computing the activity of the variable, this activity will be underestimated.

Additionally, some SAT-solvers periodically divide the activity counters by a small constant. This strategy may not be able to adjust quickly enough to changes in the set of relevant variables. For example, suppose activity counters are divided by 2 every 100 conflicts and suppose that immediately after dividing the counters, a change of relevant variables occurs. Then, for the next 20-30 conflicts, the choice of branching variables will be dominated by an obsolete set of active variables.

Moreover, current SAT-solvers examine the whole set of variables each time they select a branching variable. This may be inefficient when there is a large number of variables in the set. Further, some of the current SAT-solvers remove conflict clauses based solely on the size (or length) of the conflict clause, i.e., the number of literals in the clause. However, some conflict clauses that have a sizeable number of literals may be more useful than conflict clauses with less literals. Consequently, removing conflict clauses simply based on size may be unwise. Other SAT-solvers remove conflict clauses whenever the memory is full. Not only is this inefficient, it may also lead to the removal of useful conflict clauses.

The present invention provides a method and system for solving satisfiability problems. In one embodiment, a plurality of clauses in a satisfiability problem are organized as a chronologically ordered stack. The stack has a top and a bottom and newly deduced conflict clauses are added to the top of the stack. A branching variable is then selected from a plurality of unassigned variables in the CNF formula and the selected branching variable is assigned a value of 0 or 1. One or more clauses are marked as satisfied, and Boolean Constraint Propagation is invoked when the stack contains one or more unit clauses. The process of making value assignment to branching variables (accompanied by invoking Boolean Constraint Propagation) goes on until one of the following two conditions hold. If all the clauses of the stack are satisfied, the accumulated set of variable assignments is returned as a solution. The second condition is that a clause which is unsatisfiable under the current set of assignments is produced. In that case, a new clause is learned and added to the stack. After that, a subset of last assignments is undone and new assignments to branching variables followed by Boolean Constraint Propagation are made. This goes on until an empty clause is derived (the initial formula is unsatisfiable) or a solution is found (the initial formula is satisfiable).

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Figure 1:
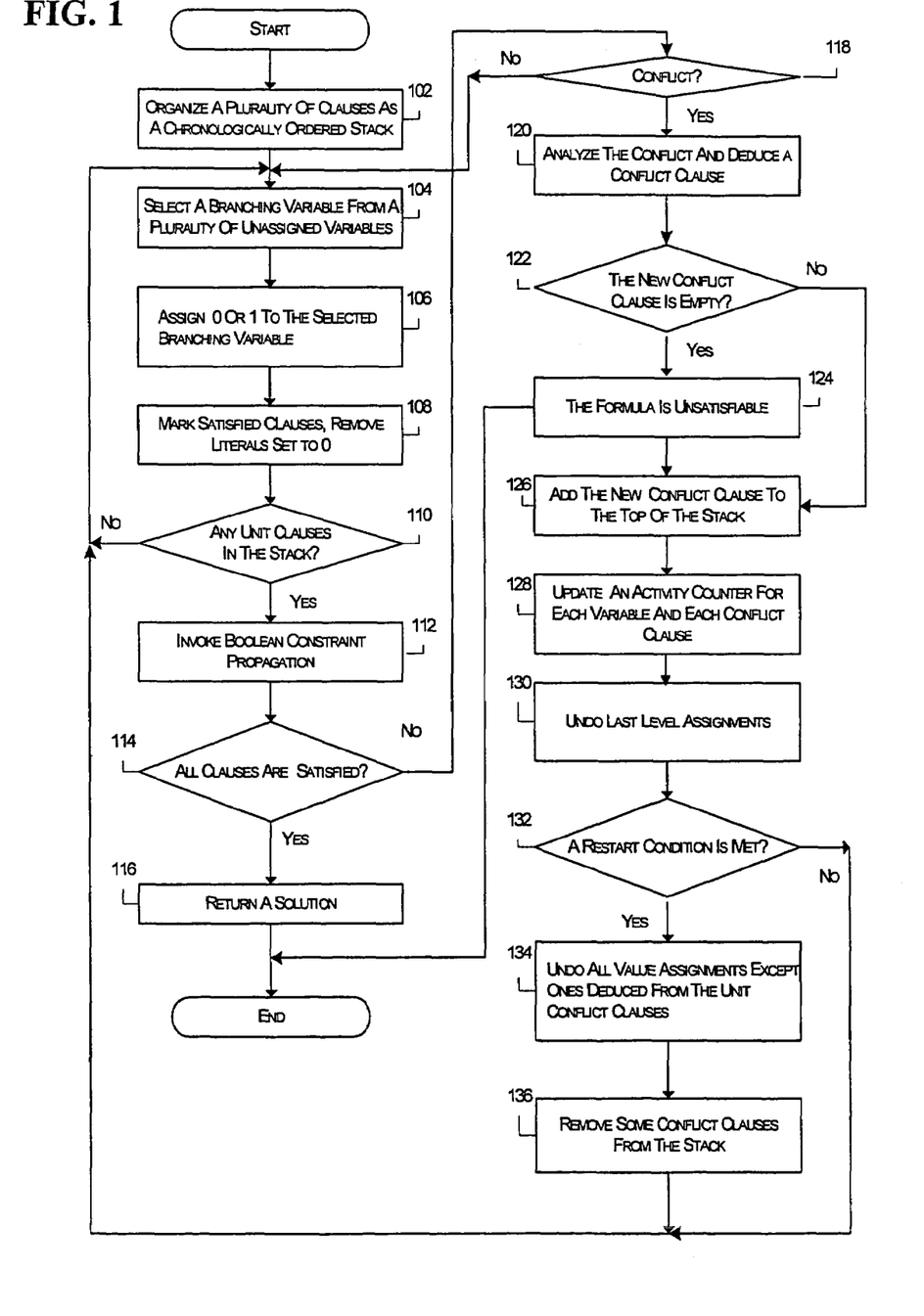
FIG. 1 illustrates a process flow of a method for solving satisfiability problems according to an embodiment of the invention.

Illustrated in FIG. 1 is a method of solving satisfiability problems according to an embodiment of the invention. At 102, a plurality of clauses of the original CNF formula are organized as a chronologically ordered stack. The stack has a top and a bottom and may include both initial and conflict clauses. Initial clauses are clauses of the original CNF formula. In some embodiments, the initial clauses are on the bottom of the stack and newly deduced conflict clauses are added to the top of the stack.

A branching variable is selected from a plurality of unassigned variables of the current CNF formula at 104. In one embodiment, when the clause on top of the stack is a conflict clause, the branching variable is selected from among a set of unassigned variables in the top clause rather than from among all of the unassigned variables of the current CNF formula.

At 106, a value of one or zero is assigned to the selected branching variable. In deciding whether to assign one or zero to the selected branching variable, costs associated with positive and negative literals of this variable may be taken into account. The cost of a literal, in some embodiments, is equal to the total number of conflict clauses containing the literal. The branching variable is assigned the value setting to one the literal with a higher associated cost. In other embodiments, the cost of a literal is equal to the total number of binary clauses containing the literal plus, for each binary clause C containing the literal, the total number of binary clauses containing the opposite of the other literal of the clause C. The branching variable is assigned the value setting to zero the literal with a higher associated cost.

Some stack clauses get satisfied as a result of assigning a value to the selected branching variable. Besides, all literals of the selected branching variable of one polarity become equal to 0. The satisfied clauses are marked and the literals set to zero are removed (108). Boolean Constraint Propagation is invoked (112) when the stack contains any unit clauses (110). Otherwise, the process returns to (104). If all clauses of the current formula are satisfied (114), the accumulated set of value assignments is returned as a solution (116). If no solution has been found, a determination is made at 118 as to whether a conflict has arisen. A conflict arises when all of the literals in a clause are assigned to zero. If no conflicts have arisen, the process returns to 104. If a conflict has arisen, a conflict analysis procedure is invoked at 120 to deduce a new conflict clause. If the new conflict clause is empty, i.e. it does not contain literals (122), then the original CNF formula is proven to be unsatisfiable (124), and the process ends. Otherwise, the new conflict clause is added to the top of the stack (126).

An activity counter is maintained for each variable and each conflict clause in the current CNF formula (128). The activity counter of a variable may be incremented each time the variable appears in a clause involved in a conflict. A clause C is involved in a conflict if during Boolean Constraint Propagation, the clause C becomes unit and a deduced assignment is made to satisfy C, which later leads to a conflict. The decision as to which branching variable is selected at 104 may be based upon the activity of the variable. For example, the selected branching variable may be the variable with the highest activity counter among all of the unassigned variables in the current CNF formula or among all of the unassigned variables in the top clause of the stack. The activity counters may be periodically divided by a constant greater than one. The last level assignments are undone, (130).

At 132, a determination is made as to whether one of two restart conditions is met. One restart condition holds true when the number of conflict clauses added to the stack since the last restart has exceeded a threshold. In one embodiment, the threshold is 550 conflict clauses. The threshold may be less or more in other embodiments. The other restart condition is met when the number of unit conflict clauses of the current CNF formula exceeds a threshold value. If neither restart condition holds true, the process returns to 104. Otherwise, a restart takes place. All assignments except ones made to satisfy unit conflict clauses are undone, (134). After that, Boolean Constraint Propagation procedure is invoked and the clauses satisfied during this procedure are removed from the current formula. Besides, some clauses are removed from the clause database or stack (136). (In the following exposition the terms "clause database" and "stack of clauses" denote different aspects of the same object which is the current CNF formula.) Then the process returns to 104.

The conflict clauses removed from the stack during restart may be near the bottom of the stack, i.e., earlier deduced conflict clauses. In one embodiment, at least one of the "bottom" conflict clauses removed from the stack has more than eight literals. In another embodiment, at least one of the conflict clauses removed from the bottom of the stack has an activity counter value less than sixty.

Conflict clauses removed from the stack may also be near the top of the stack, i.e., more recently deduced conflict clauses. In one embodiment, at least one of the "top" conflict clauses removed from the stack has more than forty-two literals. In another embodiment, at least one of the "top" conflict clauses removed from the stack has an activity counter value less than seven.

In some embodiments, the top conflict clause in the stack is never removed. In other embodiments, no less than a specified part of the conflict clauses in the stack are removed. For example, no less than 6.25% of the conflict clauses in the stack are removed.

Boolean Constraint Propagation (BCP)

After choosing a branching variable (say variable y) and assigning it a value, the Boolean Constraint Propagation (BCP) procedure may be initiated. Any appropriate BCP procedure may be used. In one example embodiment, the BCP procedure is as follows. Suppose that y is assigned value 1. The negative literal of y, i.e., ~y, is set to 0. Setting the literal ~y to 0 may produce a unit clause, i.e., an unsatisfied clause in which all literals but one are set to 0. Suppose C is such a unit clause and ~x is the literal of C that is not set to any value yet (i.e. the variable x is unassigned yet). This clause can be satisfied only by assigning 0 to the variable x. This assignment is called deduced from clause C. After making the deduced assignment (e.g., x=0), the procedure of setting literals to 0 (e.g., the positive literals of x) is performed again. This may lead to producing new unit clauses.

The BCP procedure is performed until (1) a solution is found, (2) all clauses of the current CNF formula contain at least two literals, or (3) an unsatisfiable clause, i.e. a clause with all literals set to 0, is produced (this situation is called a conflict). Before producing an unsatisfiable clause, two unit clauses having the opposite literals of the same unassigned variable appear, for example, z and ~z. Deducing the value of z from either clause makes the other clause unsatisfiable.

In one embodiment, the size (or length) of each clause, i.e., the number of unassigned variables in each clause, is monitored. For example, each time a literal of a clause is set to 0, the counter keeping track of the size of this clause is updated. In another embodiment, rather than constantly monitoring the size of each clause, two watch literals are selected for each clause. The size of a clause C is only checked when one of the watch literals is assigned a value. If the assigned value is 1, then the clause is satisfied. If the assigned value is 0 and C is not satisfied yet, then a new watch literal is looked for.

Conflict Clause Generation and Backtracking

Suppose that BCP has been completed and no solution is found in the current node. If no conflict is encountered, then the algorithm moves to the next node. If there is a conflict, the algorithm backtracks. The best way to describe backtracking is to use the notion of a level of assignments. A level of assignments consists of one assignment to a branching variable and all the assignments deduced in the following BCP. (In terms of search trees, a level of assignments consists of all the assignments made at a node of the search tree. For this reason, below, we use terms "node" and "level" interchangeably.) All levels are numbered by consecutive numbers, the root node of the search tree having the level value equal to 1. Backtracking may be chronological (when only the assignments of the current level are erased and the algorithm moves to the previous level) or non-chronological (when assignments of more than one consecutive levels are erased before the algorithm stops backtracking). Both types of backtracking are explained by the example below.

Suppose a CNF formula F consists of the set of clauses of the initial CNF formula F* and implicates of the initial formula F* deduced during search. Let C be a clause of F. Suppose that a conflict is caused by clause C=~a+x+~c ('+' denotes logical OR) being unsatisfiable. That is, the variables a, x, c have been assigned a=1, x=0, c=1, which resulted in setting all three literals of C to 0. A set R of value assignments to variables of F is called an assignment leading to a conflict on C (or a conflict assignment for short) if, after making the assignment from R and running the BCP procedure, clause C becomes unsatisfiable. The clause of |R| literals that are all set to 0 by assignments of R is called the conflict clause recording conflict assignment R (or just a conflict clause for brevity).

A trivial assignment making clause C=~a+x+~c unsatisfiable is the set a=1, x=0, c=1). However, this conflict assignment is of no interest since the corresponding conflict clause is already in the formula. Suppose, that R={x=0, y=1, z=1} is also an assignment leading to a conflict on C. Then clause C'=x+~y+~z specified by set R is an implicate of the current F and can be added to F. All literals of the clause C' are set to 0 by assignments from R={x=0, y=1, z=1} and so C' is a conflict clause.

Suppose that assignment x=0 of R={x=0, y=1, z=1} is made at the current level. Additionally, assume that assignments y=1 and z=1 were made at levels v' and v", respectively. Suppose also that v>v'>v" where $n_1>n_2$ means that level $n_2$ is closer to the root level than level $n_1$. After adding conflict clause x+~y+~z to the current F, it is possible to backtrack from level v to level v' (erasing all the assignments made at the level v and all the levels between v and v' if any). The CNF formula $F_{v'}$ at level v' is different from the one obtained at level v' before because the clause x+~y+~z has been added to the clause database. Since variables y and z are assigned value 1 at levels v' and v", then at level v' clause x+~y+~z of $F_{v'}$ is unit and so assignment x=1 can be deduced from it. Before adding clause x+~y+~z, this deduction was not possible. If v>v'+1, then there is at least one level of assignments between v and v'. The adding of this clause to the current formula allows the algorithm to back-jump (i.e., non-chronologically backtrack) to level v' skipping at least one level. However, if v=v'+1, then the algorithm backtracks chronologically, namely, it backtracks to the previous level v'.

For conflict analysis, suppose that at the current node v clause ~a+x+~c becomes unsatisfiable. To build a conflict clause corresponding to this conflict, a conflict assignment R that contains only one assignment made at node v needs to be found. This may be an assignment made to the branching variable of node v or an assignment deduced in the BCP procedure performed at node v. The rest of the assignments of R are made at nodes located on the path of the search tree from the root node to the node v.

Such a conflict assignment can be constructed from assignment $R_1$={a=1, x=0, c=1} (that is the conflict assignment recorded by the clause ~a+x+~c) by performing the BCP procedure "backwards". For example, suppose that all the value assignments of $R_1$ were made at node v and assignment a=1 was deduced from clause a+x+~z (due to assignments x=0, z=1 made before). Now $R_1$ can be replaced with a conflict assignment $R_2$={x=0, c=1, z=1}. This conflict assignment is obtained from $R_1$ by replacing assignment a=1 with x=0, z=1. Suppose that assignment z=1 was deduced at node v' and v'<v. Then conflict assignment $R_2$ contains only two assignments (x=0 and c=1) that were made at node v. Proceeding with the "reverse" BCP procedure we will eventually produce a conflict assignment containing only one assignment made at node v. Suppose, for example, that assignment c=1 was deduced from clause c+~y+~z and assignment y=1 was made at node v", where v"<v. By replacing c=1 with y=1, z=1 in $R_2$ we obtain conflict assignment $R_3$=1×=0, y=1, z=1). $R_3$ satisfies the requirement above, because only one assignment of $R_3$, namely x=0, is made at node v. The conflict clause corresponding to $R_3$ is x+~y+~z.

Formally, the deduction of clause x+~y+~z can be described by the following chain of resolutions: resolve ((~a+x+~c),(a+x+~z))→x+~c+~z, resolve((x+~c+~z),(c+~y+~z))→x+~y+~z. Only the final result of this chain (i.e., clause x+~y+~z) is added to the current CNF formula. Conflict clauses corresponding to intermediate conflict assignments (e.g., x+~c+~z) are thrown away. Clauses of the current F that are used in the deduction of the final conflict clause are called clauses responsible for the conflict. In the example, clauses ~a+x+~c, a+x+~z, and c+~y+~z are responsible for the conflict. Clauses responsible for a conflict are identified during the reverse BCP procedure and used to construct the conflict clause to be added to the clause database.

Variable Selection

In one embodiment, each variable is assigned a counter (e.g., ac(z)) that stores the number of clauses, responsible for at least one conflict, that have a literal of z. The value of ac(z) is updated during the reverse BCP procedure. As soon as a new clause responsible for the current conflict is encountered, the counters of the variables, whose literals are in this clause, are incremented by 1. In another embodiment, the values of all counters are periodically divided by a small constant greater than 1, e.g., 4. Periodically dividing counters by a small constant decreases the influence of aged clauses and gives preference to recently deduced clauses.

The clause database may be organized as a stack. Clauses of the initial CNF formula are located at the bottom of the stack and each new conflict clause is added to the top of the stack. In the process of assigning values, some clauses of the stack are satisfied. The unsatisfied clause at the top of the stack will be referred to as the current top clause. If the current top clause is a conflict clause, then it is the most recently deduced conflict clause that has yet to be satisfied.

Suppose C is the current top clause. In one embodiment, the next branching variable is selected from among free (unassigned) variables of C when C is a conflict clause. Among the variables of C, a variable z with the largest value of ac(z) is selected. Variable z may look passive in the set of all the currently free variables. However, the activity of these variables may be the result of a very different set of conflicts that happened before deducing C or will have occurred after the deduction of C. These conflicts may involve different sets of variables. Choosing z takes into account the fact that these active variables may be irrelevant to the conflict which had led to the deduction of C and to similar conflicts, i.e., the ones involving sets of variables that are close to that of C.

Let ~z be the literal of variable z that is in the top clause C. Suppose that z is chosen as the next branching variable. In one embodiment, C is not immediately satisfied by assigning z=0. If C is not satisfied by the chosen assignment to z and no conflict is produced during the following BCP procedure, C remains the current top clause. Then a new free variable is selected from the ones whose literals are in C. Hence, eventually either C will be satisfied by an assignment to a branching variable (or by a deduced assignment) or after removing from C all literals but one it will be satisfied during the BCP procedure.

If the current top clause is a clause of the original formula, then all the unsatisfied clauses in the stack are also clauses of the original formula. In an embodiment, the most active free variable of the current formula (i.e., free variable z with the greatest value of ac(z)) is selected.

Branch Selection

When the current top clause is a conflict clause, one of the goals in the selection of a first assignment value to a variable x is to maintain uniform distribution of positive and negative literals in conflict clauses of the database. Thus, for each literal l, cost function lit_ac(l) is computed. lit_ac(l) gives the number of conflict clauses generated so far that contain literal l. Initially lit_ac(l) is equal to 0. As soon as a conflict clause C is added to the database, for each literal l of C, the value of lit_ac(l) is incremented by 1. In one embodiment, the value of lit_ac(l) is not divided by a constant. In another embodiment, the value of lit_ac(l) is not recomputed after some conflict clauses are removed from the database.

If x is the next branching variable, the literal l∈{x, ~x} with the largest value of lit_ac(l) is selected. When lit_ac(x)=lit_ac(~x), literal l, l∈{x, ~x}, is selected at random and x is assigned the value setting the chosen literal l to 1. Hence, clauses having literal l become satisfied and no conflict clause can contain l. On the other hand, the opposite literal (i.e., ~l) is set to 0 and so conflict clauses may include ~l. Thus, setting the literal with the largest value of lit_ac(l) to 1 reduces the gap between the number of occurrences of x and ~x in conflict clauses of the clause database.

When the current top clause is a clause of the original formula, a cost function nb_two(l) may be computed for each literal l, which approximates the number of binary clauses in the "neighborhood" of literal l. A clause is binary if it contains only two literals. Function nb_two(l) is computed as follows. First, the number of all binary clauses containing literal l is calculated. Then, for each binary clause C containing literal l, the number of binary clauses containing literal ~v is computed where v is the other literal of C. The sum of all computed numbers gives the value of nb_two(l). This cost function can be considered as an estimate of the power of BCP performed after setting l to 0. The greater the value of nb_two(l) is, the more assignments will be deduced from the binary clauses containing literal ~v after setting literal l to 0 in clause C.

When nb_two(x)=nb_two(~x), l∈{x, ~x} is chosen at random. Variable x is then assigned the value setting literal l to 0. To reduce the amount of time spent on computing nb_two(l), a threshold value may be used, for example 100. As soon as the value of nb_two(l) exceeds the threshold, its computation is stopped.

Conflict Clause Database Management

Before starting the next iteration (i.e., building a new search tree), some clauses may be physically removed from the database. This allows for reduction of memory used for database allocation. In the process of removing clauses, data structures may be partially or completely recomputed to fit them into smaller memory blocks.

A fraction of clauses may be removed automatically due to retaining some value assignments deduced in the last iteration. Namely, the value assignments that were deduced from unit conflict clauses (if any) and triggered by assignments deduced from unit conflict clauses in the BCP procedure are retained in the new iteration. Clauses that are satisfied by the retained assignments are removed from the current formula.

The rest of the clauses to be removed may be selected using heuristics described below. One of the hypothesis for the approach described below is that more recently deduced clauses are more valuable because it took more time to deduce them from the original set of clauses.

From the view point of clause removal heuristics, the set of conflict clauses is a queue. New conflict clauses are added to the tail of this queue while clauses to be considered for removal are located at its head. In one embodiment, clauses with more than 8 literals are removed from the first $1/16^{th}$ part of the queue starting from the head. Clauses containing more than 42 literals are removed from the remaining $15/16^{th}$ part of the queue. In another embodiment, the last conflict clause is kept regardless of how many literals it has. In a further embodiment, a fraction of active clauses are kept regardless of how many literals they have. The activity of a clause C may be measured by the number of conflicts C has been responsible for thus far. In one embodiment, clauses at the head of the queue are considered to be active when their activity value is greater than 60. For the rest of the queue, active clauses are ones with activity values greater than 7. In another embodiment, the threshold value of the activity for clauses at the head of the queue has a starting value of 60 and is increased every 1024 nodes of the search tree. Thus, large clauses that are not used in any further conflicts will be removed from the database.

In one embodiment, the current search tree is abandoned after generating 550 conflict clauses that are added to the tail of the queue. In another embodiment, before starting a new search tree, clauses are removed in order to get rid of at least $1/16$ of the conflict clauses in the queue. If after applying the rules described above, the number of removed clauses is less than $1/16$ of the queue, the threshold on the size of clauses removed from the head of the queue may be decreased by one literal in one embodiment. In one embodiment, once the threshold value reaches 4, it is not decreased any further.

Looping may occur as a result of removing one or more clauses from the queue, i.e., it is possible that a set of clauses that has been removed is deduced again. One way of eliminating the possibility of looping is to mark one conflict clause deduced since the last restart as non-removable, unless it is satisfied by an assignment retained from the previous iteration. This guarantees that the number of marked clauses in the database grows monotonically, and therefore no looping is possible. The number of marked clauses to be kept can be reduced n times by marking a clause only after performing n iterations, i.e., after n restarts.

ILLUSTRATIVE EXAMPLE

One example of solving a formula F is set forth below:

Suppose that a formula F to be tested for satisfiability consists of the following set of clauses (symbol '~' means negation).

F={

$C_1 = a+b+c$, $C_2 = \sim a+d$, $C_3 = \sim b+c$, $C_4 = \sim d+e$, $C_5 = \sim e+b+\sim c$, $C_6 = m+\sim d+f$, $C_7 = \sim m+w$, $C_8 = \sim m+\sim w+\sim a$

}

Initially the stack of clauses is empty. Suppose that the first assignment made is a=1. (This assignment is called a decision assignment in contrast to an assignment made to satisfy a unit clause. This assignment may also be called deduced). A node $n_1$ of the search tree is created and labeled with variable a. There are two branches (labeled a=1 and a=0) coming out of this node. Since a=1 is the first assignment, the branch labeled a=1 is examined first. After this assignment is made, clause $C_1$ is satisfied. Literal ~a is then set to 0 and removed from clauses. $C_2$ and $C_8$. Clause $C_2$ then becomes a unit clause as it now only contains literal d. Since unit clauses have appeared in the current formula, the BCP procedure is invoked. For the sake of clarity it is assumed that BCP is invoked "inside" the node $n_1$. Before invoking the BCP procedure, formula F is equal to $C_2 = d$, $C_3 = \sim b+c$, $C_4 = \sim d+e$, $C_5 = \sim e+b+\sim c$, $C_6 = m+\sim d+f$, $C_7 = \sim m+w$, $C_8 = \sim m+\sim w$ The BCP procedure is started by making assignment d=1 as this is the only way clause $C_2$ can be satisfied. As mentioned above, this assignment is called a deduced assignment. After assigning d=1, the clause $C_2$ is satisfied while the literal ~d is set to 0 and removed from $C_4$ and $C_6$. $C_4$ then becomes a unit clause that can only be satisfied by assigning 1 to e. After making this assignment, clause $C_4$ is satisfied and literal ~e is removed from $C_5$. At this point, BCP stops because there are no unit clauses left.

The current formula (denote it by $F(n_1)$) that is obtained by making decision assignment a=1 followed by the BCP procedure is now equal to:

$F(n_1)=\{$.

$C_3 = \sim b+c$, $C_5 = b+\sim c$, $C_6 = m+f$, $C_7 = \sim m+w$, $C_8 = \sim m+\sim w$

}

Suppose a new decision assignment m=1 is made. A new node $n_2$, labeled with m, of the search tree is created. The branch labeled with m=1 is then examined. After making this assignment, clause $C_6$ is satisfied while clauses $C_7$ and $C_8$ become unit clauses. The formula is now equal to $C_3 = \sim b + c,$ $C_5 = b + \sim c,$ $C_7 = w,$ $C_8 = \sim w$ Since unit clauses ($C_7$ and $C_8$) appeared in the formula, the BCP procedure can be invoked. Suppose BCP is started by satisfying clause $C_7$, that is, assignment w=1 is made. With that assignment, literal ~w equals 0 and is removed from $C_8$, which makes this clause unsatisfiable because it does not contain any literals. This situation is called a conflict because in order to satisfy both $C_7$ and $C_8$, opposite values have to be assigned to variable w. At this point a conflict clause is deduced and the procedure backtracks. The deduced conflict clause is $C_9 = \sim a + \sim m$. This clause specifies the fact that making assignments a=1 and m=1 leads to a conflict. That is, there is no solution (i.e., a value assignment satisfying all the clauses) in which a=1 and m=1. The clause ~a+~m is the first clause to be added to the stack.

When the procedure backtracks, it returns to the node where the last decision assignment was made, i.e., the procedure returns to node $n_1$ where the last decision assignment m=1 was made. Note that the formula at the node $n_1$, denote it by $F^*(n_1)$, is $F^*(n_1) = \{$ $C_3 = \sim b + c,$ $C_5 = b + \sim c,$ $C_6 = m + f,$ $C_7 = \sim m + w$ $C_9 = \sim m$ $\}$ different from $F(n_1)$ because conflict clause $C_9$ has now been added. This clause is equal to ~m at the node $n_1$ because at the root node of the search tree, an assignment a=1 had been made. Hence, literal ~a has been removed from clause $C_9$, which makes it a unit clause. Since the current formula contains a unit clause, BCP is invoked. $C_9$ is satisfied by making assignment m=0, which satisfies clauses $C_7$ and $C_8$ as well. Literal m is removed from $C_6$, which makes $C_6$ a unit clause with literal f. By setting f to 1, $C_6$ is satisfied.

At this point only two clauses ($C_3 = \sim b + c$ and $C_5 = b + \sim c$) are left. Therefore, BCP stops as there are no more unit clauses. Suppose assignment b=0 is made. The assignment satisfies clause $C_3$ and removes literal b from clause $C_5$. $C_5$ then becomes a unit clause with literal ~c. BCP is invoked and c is assigned value 0. At this point all of the clauses of the formula are satisfied and a solution has been found. The solution includes the decisions and deduced assignments made down the path leading to the last, i.e. current, node, the decision assignment made at this last node, and the deduced assignments derived after making this last decision assignment. These assignments are a=1, d=1, e=1, m=0, f=1, b=0, c=0.

System Architecture Overview

Figure 2:
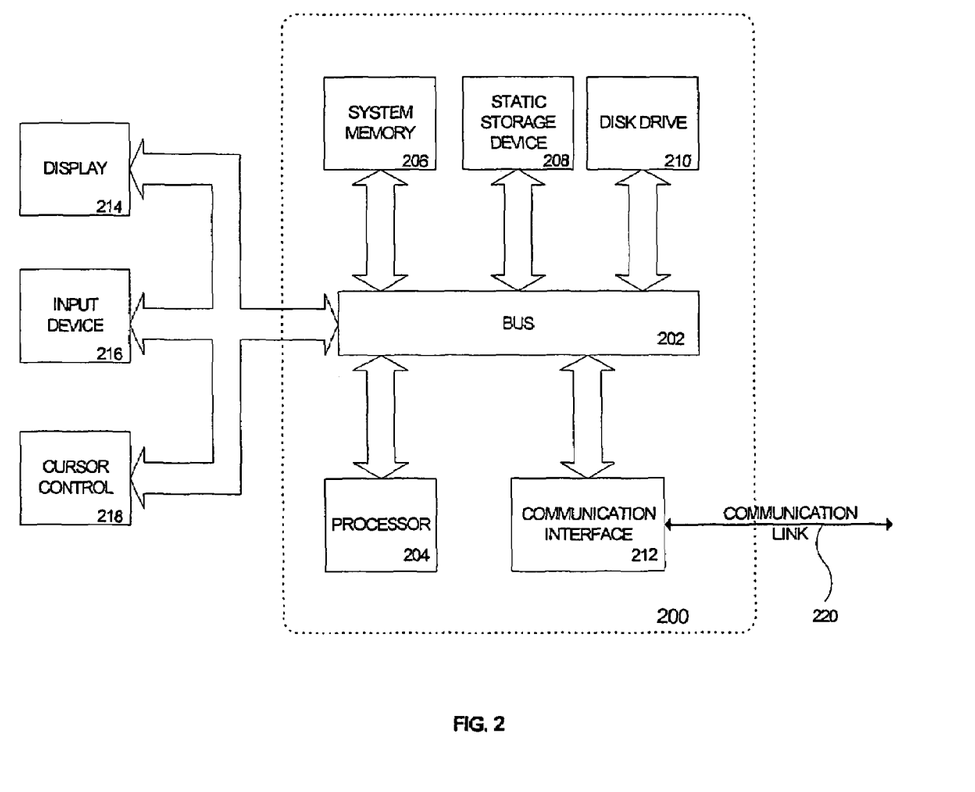
FIG. 2 depicts a computer system with which embodiments of the present invention can be implemented.

FIG. 2 is a block diagram of a computer system 200 suitable for implementing an embodiment of the present invention. Computer system 200 includes a bus 202 or other communication mechanism for communicating information, which interconnects subsystems and devices, such as processor 204, system memory 206 (e.g., RAM), static storage device 208 (e.g., ROM), disk drive 210 (e.g., magnetic or optical), communication interface 212 (e.g., modem or ethernet card), display 214 (e.g., CRT or LCD), input device 216 (e.g., keyboard), and cursor control 218 (e.g., mouse or trackball).

According to one embodiment of the invention, computer system 200 performs specific operations by processor 204 executing one or more sequences of one or more instructions contained in system memory 206. Such instructions may be read into system memory 206 from another computer readable medium, such as static storage device 208 or disk drive 210. In alternative embodiments, hard-wired circuitry may be used in place of or in combination with software instructions to implement the invention.

The term "computer readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as disk drive 210. Volatile media includes dynamic memory, such as system memory 206. Transmission media includes coaxial cables, copper wire, and fiber optics, including wires that comprise bus 202. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 200. According to other embodiments of the invention, two or more computer systems 200 coupled by communication link 220 (e.g., LAN, PTSN, or wireless network) may perform the sequence of instructions required to practice the invention in coordination with one another.

Computer system 200 may transmit and receive messages, data, and instructions, including program, i.e., application code, through communication link 220 and communication interface 212. Received program code may be executed by processor 204 as it is received, and/or stored in disk drive 210, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of solving satisfiability problems, the method comprising:

(a) organizing a plurality of clauses in a satisfiability problem as a chronologically ordered structure comprising a top and a bottom, wherein newly deduced conflict clauses are added to the top of the structure, and maintaining individual activity counters for variables in the plurality of clauses, wherein the individual activity counters are incremented only based upon clauses that are involved in a conflict where a clause C is involved in the conflict if during Boolean Constraint Propagation, the clause C becomes a unit and a deduced assignment is made to satisfy C which leads to the conflict;

(b) selecting a branching variable from a plurality of unassigned variables in the satisfiability problem, in which the branching variable is selected by selecting a clause and an active variable from the clause based upon the activity counter, wherein the branching variable is selected based upon a high activity counter;

(c) assigning value 0 or 1 to the selected branching variable;

(d) marking literals set to 0;

(e) invoking Boolean Constraint Propagation when the structure comprises one or more unit clauses;

(f) repeating (b)-(e) when the structure only comprises one or more non-unit clauses; and (g) returning a solution if a solution is found.

2. The method of claim 1, wherein the structure comprises at least one initial clause and at least one conflict clause.

3. The method of claim 2, wherein at least one initial clause is located below the at least one conflict clause in the structure.

4. The method of claim 1, wherein the branching variable is selected from among a set of unassigned variables in the clause on top of the structure when the top clause is a conflict clause.

5. The method of claim 1, further comprising:
maintaining the activity counter for each variable.

6. The method of claim 1, wherein the activity counter of a variable is incremented each time the variable appears in a clause used when generating a conflict clause.

7. The method of claim 1, wherein the selected branching variable comprises an activity counter with the highest value.

8. The method of claim 1, wherein the activity counters are periodically divided by a constant greater than one.

9. The method of claim 1, wherein whether 0 or 1 is assigned to the selected branching variable depends upon costs associated with the positive and negative literals of this variable.

10. The method of claim 9, wherein the cost of a literal is equal to the total number of conflict clauses containing the literal.

11. The method of claim 9, wherein the cost of a literal is equal to the total number of binary clauses containing the literal plus, for each binary clause containing the literal, the total number of binary clauses containing an opposite of the other literal in the binary clause.

12. The method of claim 9, wherein, if there is at least one unsatisfied conflict clause, the selected branching variable is assigned value 1 if the cost associated with the positive literal of this variable is higher than the cost associated with the negative literal.

13. The method of claim 9, wherein, if there is at least one unsatisfied conflict clause, the selected branching variable is assigned value 0 if the cost associated with the negative literal of this variable is higher than the cost associated with the positive literal.

14. The method of claim 9, wherein, if all conflict clauses are satisfied, the selected branching variable is assigned value 0 if the cost associated with the positive literal of this variable is higher than the cost associated with the negative literal.

15. The method of claim 9, wherein, if all conflict clauses are satisfied, the selected branching variable is assigned value 1 if the cost associated with the negative literal of this variable is higher than the cost associated with the positive literal.

16. The method of claim 1, further comprising:
maintaining an activity counter for each conflict clause; and
removing one or more conflict clauses from the structure.

17. The method of claim 16, wherein the activity counter of a conflict clause is incremented each time this conflict clause is used when generating another conflict clause.

18. The method of claim 16, wherein at least one of the one or more conflict clauses removed from the structure is near the bottom of the structure.

19. The method of claim 18, wherein at least one removed conflict clause comprises more than eight literals.

20. The method of claim 18, wherein at least one removed conflict clause comprises an activity counter with a value less than sixty.

21. The method of claim 16, wherein at least one of the one or more conflict clauses removed from the structure is near the top of the structure.

22. The method of claim 21, wherein at least one removed conflict clause comprises more than forty-two literals.

23. The method of claim 21, wherein at least one removed conflict clause comprises an activity counter with a value less than seven.

24. The method of claim 16, wherein the one or more unsatisfied conflict clauses removed from the structure do not include the clause at the top of the structure.

25. The method of claim 16, wherein no less than a specified percentage of the conflict clauses in the structure are removed.

26. The method of claim 16, wherein the top conflict clause of the structure is never removed.

27. The method of claim 1, further comprising:
invoking reverse Boolean Constraint Propagation when a conflict arises;
deducing a new conflict clause; and returning the answer "no solution" if this clause is empty or adding the newly deduced conflict clause to the top of the structure otherwise.

28. The method of claim 27, wherein a conflict arises when all literals in one of the plurality of clauses are set to 0 as a result of one or more assignments of value.

29. The method of claim 27, wherein backtracking is non-chronological.

30. The method of claim 1, further comprising:
starting a new search tree when more than a threshold number of conflict clauses have been deduced or more than a threshold number of unit conflict clauses have been deduced.

31. A computer readable medium storing instructions, which, when executed by a processing system, cause the system to perform a method of solving satisfiability problems, the method comprising:
(a) organizing a plurality of clauses in a satisfiability problem as a chronologically ordered structure comprising a top and a bottom, wherein newly deduced conflict clauses are added to the top of the structure, and maintaining individual activity counters for variables in the plurality of clauses, wherein the individual activity counters are incremented only based upon clauses that are involved in a conflict where a clause C is involved in the conflict if during Boolean Constraint Propagation, the clause C becomes a unit and a deduced assignment is made to satisfy C which leads to the conflict;

(b) selecting a branching variable from a plurality of unassigned variables in the satisfiability problem, in which the branching variable is selected by selecting a clause and an active variable from the clause based upon the activity counter, wherein the branching variable is selected based upon a high activity counter;

(c) assigning value 0 or 1 to the selected branching variable;

(d) marking literals set to 0;

(e) invoking Boolean Constraint Propagation when the structure comprises one or more unit clauses;

(f) repeating (b)-(e) when the structure only comprises one or more non-unit clauses; and (g) returning a solution if a solution is found.

32. The medium of claim 31, wherein the structure comprises at least one initial clause and at least one conflict clause.

33. The medium of claim 32, wherein at least one initial clause is located below the at least one conflict clause in the structure.

34. The medium of claim 31, wherein the branching variable is selected from among a set of unassigned variables in the clause on top of the structure when the top clause is a conflict clause.

35. The medium of claim 31, the method further comprising:
maintaining an activity counter for each unassigned variable.

36. The medium of claim 35, wherein the activity counter of an unassigned variable is incremented each time the unassigned variable appears in a clause used when generating a conflict clause.

37. The medium of claim 35, wherein the selected branching variable comprises an activity counter with the highest value.

38. The medium of claim 35, wherein the activity counters are periodically divided by a constant greater than one.

39. The medium of claim 31, wherein whether 0 or 1 is assigned to the selected branching variable depends upon costs associated with the positive and negative literals of this variable.

40. The medium of claim 39, wherein the cost of a literal is equal to the total number of conflict clauses containing the literal.

41. A system for solving satisfiability problems, the system comprising:
means for organizing a plurality of clauses in a satisfiability problem as a chronologically ordered structure comprising a top and a bottom, wherein newly deduced conflict clauses are added to the top of the structure, and maintaining individual activity counters for variables in the plurality of clauses;
means for selecting a branching variable from a plurality of unassigned variables in the satisfiability problem, in which the branching variable is selected by selecting a clause and an active variable from the clause based upon the activity counter, wherein the individual activity counters are incremented only based upon clauses that are involved in a conflict where a clause C is involved in the conflict if during Boolean Constraint Propagation, the clause C becomes a unit and a deduced assignment is made to satisfy C which leads to the conflict;
means for assigning value 0 or 1 to the selected branching variable;
means for marking literals set to 0;
means for invoking Boolean Constraint Propagation when the structure comprises one or more unit clauses;
means for repeating the selecting, assigning, marking, and invoking when the structure only comprises one or more non-unit clauses; and
means for returning a solution if a solution is found.

42. The system of claim 41, wherein the structure comprises at least one initial clause and at least one conflict clause.

43. The system of claim 42, wherein at least one initial clause is located below the at least one conflict clause in the structure.

44. The system of claim 41, wherein the branching variable is selected from among a set of unassigned variables in the clause on top of the structure when the top clause is a conflict clause.

45. The system of claim 41, further comprising:
means for maintaining an activity counter for each unassigned variable.

46. The system of claim 45, wherein the activity counter of an unassigned variable is incremented each time the unassigned variable appears in a clause used when generating a conflict clause.

47. The system of claim 45, wherein the selected branching variable comprises an activity counter with the highest value.

48. The system of claim 45, wherein the activity counters are periodically divided by a constant greater than one.

49. The system of claim 41, wherein whether 0 or 1 is assigned to the selected branching variable depends upon costs associated with the positive and negative literals of this variable.

50. The system of claim 49, wherein the cost of a literal is equal to the total number of conflict clauses containing the literal.

51. The method of claim 1 in which the structure comprises either a stack or a queue.

52. The medium of claim 31 in which the structure comprises either a stack or a queue.

53. The system of claim 41 in which the structure comprises either a stack or a queue.

54. The method of claim 1 in which the solution is applied for a circuit design undergoing synthesis, test pattern generation, or verification.

55. The medium of claim 31 in which the solution is applied for a circuit design undergoing synthesis, test pattern generation, or verification.

56. The system of claim 41 in which the solution is applied for a circuit design undergoing synthesis, test pattern generation, or verification.

* * * * *